United States Patent
Srinivasan et al.

(10) Patent No.: US 11,481,296 B2
(45) Date of Patent: Oct. 25, 2022

(54) DETECTING CONFIGURATION ERRORS IN MULTIPORT I/O CARDS WITH SIMULTANEOUS MULTI-PROCESSING

(71) Applicant: International Business Machines Corporation, Armonk, NY (US)

(72) Inventors: Muthulakshmi P. Srinivasan, Bangalore (IN); Asha Kiran Bondalakunta, Bangalore (IN); Sameer K. Sinha, Bangalore (IN); Ayush Nair, Bengaluru (IN)

(73) Assignee: International Business Machines Corporation, Armonk, NY (US)

( * ) Notice: Subject to any disclaimer, the term of this patent is extended or adjusted under 35 U.S.C. 154(b) by 136 days.

(21) Appl. No.: 16/126,057

(22) Filed: Sep. 10, 2018

(65) Prior Publication Data
US 2020/0081810 A1 Mar. 12, 2020

(51) Int. Cl.
*G06F 11/00* (2006.01)
*G06F 11/22* (2006.01)
*G06F 13/42* (2006.01)

(52) U.S. Cl.
CPC ........ *G06F 11/2289* (2013.01); *G06F 11/221* (2013.01); *G06F 13/4221* (2013.01); *G06F 2213/0024* (2013.01)

(58) Field of Classification Search
CPC ............. G06F 13/4022; G06F 11/1423; G06F 11/2033; G06F 11/2289
See application file for complete search history.

(56) References Cited

U.S. PATENT DOCUMENTS

| | | | | |
|---|---|---|---|---|
| 5,892,970 A | * | 4/1999 | Hagersten | G06F 15/17337 710/5 |
| 6,374,352 B1 | * | 4/2002 | Goldman | G06F 9/4411 713/1 |
| 6,546,482 B1 | * | 4/2003 | Magro | G06F 11/3648 710/10 |
| 7,398,421 B1 | * | 7/2008 | Limaye | H04L 69/40 714/18 |
| 7,484,188 B2 | * | 1/2009 | Duan | G06F 30/33 716/136 |
| 7,634,595 B1 | * | 12/2009 | Brown | G06F 11/201 710/17 |

(Continued)

*Primary Examiner* — Loan L. T. Truong
(74) *Attorney, Agent, or Firm* — Cantor Colburn LLP; Edward Wixted (57) ABSTRACT

A computing system detects an input/output (I/O) device configuration error. The computing system includes at least one I/O device installed with firmware configured to control an I/O function, and a plurality of I/O ports installed on the at least one I/O device. At least one I/O port outputs a request to perform a current I/O configuration initialization and generates current I/O configuration data corresponding to the current I/O configuration initialization. A memory unit is configured to store the current I/O configuration data and previously generated I/O configuration data. The I/O device compares the current I/O configuration data to the previously generated I/O configuration data, and detects the I/O device configuration error in response to determining a mismatch between the current I/O configuration data and the previously generated I/O configuration data.

20 Claims, 3 Drawing Sheets

(56) References Cited

U.S. PATENT DOCUMENTS

| | | | |
|---|---|---|---|
| 7,756,014 B1* | 7/2010 | Norrie | H04L 45/00 370/218 |
| 8,601,254 B1* | 12/2013 | Kutz | H03K 19/018592 326/38 |
| 9,250,920 B2 | 2/2016 | Sanner, III et al. | |
| 9,250,921 B2 | 2/2016 | Lee et al. | |
| 9,367,329 B2 | 6/2016 | Chang et al. | |
| 9,454,481 B2 | 9/2016 | Jacobs et al. | |
| 9,500,700 B1* | 11/2016 | Wang | G01R 31/31715 |
| 10,025,584 B2* | 7/2018 | Anand | G06F 8/65 |
| 10,430,367 B1* | 10/2019 | Khatri | G06F 9/5027 |
| 2003/0076831 A1* | 4/2003 | Van Doren | G06F 15/17375 370/394 |
| 2004/0170070 A1* | 9/2004 | Rapp | G06F 15/7867 365/200 |
| 2005/0047326 A1* | 3/2005 | Puon | H04L 45/00 370/216 |
| 2006/0179219 A1* | 8/2006 | Daikokuya | G06F 9/4411 711/170 |
| 2007/0258390 A1* | 11/2007 | Khan | H04L 45/48 370/256 |
| 2008/0126773 A1* | 5/2008 | Martinez | G06F 21/57 713/1 |
| 2009/0089462 A1* | 4/2009 | Strutt | G06F 3/0607 710/16 |
| 2009/0276773 A1* | 11/2009 | Brown | G06F 9/45558 718/1 |
| 2010/0050137 A1* | 2/2010 | Khare | G06F 30/33 716/136 |
| 2010/0169470 A1* | 7/2010 | Takashige | G06F 8/63 709/223 |
| 2011/0238817 A1* | 9/2011 | Okita | H04L 41/142 709/224 |
| 2011/0320861 A1* | 12/2011 | Bayer | G06F 11/2033 710/316 |
| 2012/0016971 A1* | 1/2012 | Wakai | G06F 13/4022 709/220 |
| 2012/0036401 A1* | 2/2012 | Lais | G06F 11/1423 714/56 |
| 2012/0102217 A1* | 4/2012 | Cardona | G06F 9/45558 709/235 |
| 2013/0007183 A1* | 1/2013 | Sorenson, III | G06F 8/65 709/213 |
| 2013/0332629 A1* | 12/2013 | Okabe | G06F 13/102 710/8 |
| 2014/0317441 A1* | 10/2014 | Arata | G06F 11/2025 714/4.12 |
| 2015/0186171 A1* | 7/2015 | Kotta | G06F 13/4022 718/1 |
| 2015/0205650 A1* | 7/2015 | Shimada | G06F 11/008 714/703 |
| 2015/0212559 A1* | 7/2015 | Ono | G06F 13/24 713/1 |
| 2015/0334683 A1* | 11/2015 | Guo | H04W 72/042 370/329 |
| 2016/0350097 A1* | 12/2016 | Mahapatra | G06F 8/654 |
| 2017/0091134 A1* | 3/2017 | Uemura | G06F 13/4022 |
| 2017/0093896 A1* | 3/2017 | Poornachandran | G06F 21/575 |
| 2017/0109228 A1 | 4/2017 | Othayoth et al. | |
| 2017/0154001 A1* | 6/2017 | Filser | G06F 13/4282 |
| 2017/0168883 A1* | 6/2017 | Ratilla | G06F 11/0745 |
| 2018/0114024 A1* | 4/2018 | Dasari | G06F 21/572 |
| 2018/0285298 A1* | 10/2018 | Lillie | G06F 13/20 |
| 2019/0075019 A1* | 3/2019 | Wang | H04L 41/0886 |
| 2019/0089592 A1* | 3/2019 | Li | H04L 41/0886 |
| 2019/0149416 A1* | 5/2019 | Grevers, Jr. | H04L 41/12 370/254 |
| 2019/0280989 A1* | 9/2019 | Itagawa | H04L 45/20 |
| 2020/0012565 A1* | 1/2020 | Sugino | G06F 11/0772 |
| 2020/0059710 A1* | 2/2020 | Huang | H04B 10/502 |
| 2020/0151048 A1* | 5/2020 | Shantamurthy | G06F 13/4068 |

* cited by examiner

DETECTING CONFIGURATION ERRORS IN MULTIPORT I/O CARDS WITH SIMULTANEOUS MULTI-PROCESSING

BACKGROUND

The present invention generally relates to data error detection in computing systems, and more specifically, to detecting input/output configuration errors in multi-processing computing systems.

I/O devices are used in computer and mainframe systems for storing and transferring data. Mainframes and computing systems can process high volumes of I/O data and are configured to simultaneously support applications and I/O devices to service thousands of users. A type of computing system referred to as a simultaneous multi-processing (SMP) computing system contains multiple central processing units (CPUs), where are capable of working in parallel, i.e., simultaneously with one another. SMP computing systems can implement multiple SMP I/O cards, where each I/O card supports multiple I/O ports.

SUMMARY

According to a non-limiting embodiment, a computing system detects an input/output (I/O) device configuration error. The computing system includes at least one I/O device installed with firmware configured to control an I/O function, and a plurality of I/O ports installed on the at least one I/O device. At least one I/O port outputs a request to perform a current I/O configuration initialization and generates current I/O configuration data corresponding to the current I/O configuration initialization. A memory unit is configured to store the current I/O configuration data and previously generated I/O configuration data. The I/O device compares the current I/O configuration data to the previously generated I/O configuration data, and detects the I/O device configuration error in response to determining a mismatch between the current I/O configuration data and the previously generated I/O configuration data.

According to another non-limiting embodiment, a computer-implemented method is provided for detecting an input/output (I/O) device configuration error. The method comprises detecting, via the I/O device, an attempt by a given I/O port among a plurality of I/O ports to perform a current I/O configuration initialization, and generating, via the given I/O port, current I/O configuration data corresponding to the current I/O configuration initialization. The method further comprises comparing, via the I/O device, the current I/O configuration data to previously generated I/O configuration data, and detecting, via the I/O device, the I/O device configuration error in response to determining a mismatch between the current I/O configuration data and the previously generated I/O configuration data.

According to still another non-limiting embodiment, a computer program product is provided to manage data transactions from an I/O device. The computer program product comprises a computer readable storage medium having stored thereon first program instructions executable by a processor to cause the processor to perform operations including detecting, via the I/O device, an attempt by a given I/O port among a plurality of I/O ports to perform a current I/O configuration initialization, and generating, via the given I/O port, current I/O configuration data corresponding to the current I/O configuration initialization. The operations further comprises comparing, via the I/O device, the current I/O configuration data to previously generated I/O configuration data, and detecting, via the I/O device, the I/O device configuration error in response to determining a mismatch between the current I/O configuration data and the previously generated I/O configuration data.

Additional technical features and benefits are realized through the techniques of the present invention. Embodiments and aspects of the invention are described in detail herein and are considered a part of the claimed subject matter. For a better understanding, refer to the detailed description and to the drawings.

BRIEF DESCRIPTION OF THE DRAWINGS

The specifics of the exclusive rights described herein are particularly pointed out and distinctly claimed in the claims at the conclusion of the specification. The foregoing and other features and advantages of the embodiments of the invention are apparent from the following detailed description taken in conjunction with the accompanying drawings in which:

The diagrams depicted herein are illustrative. There can be many variations to the diagram or the operations described therein without departing from the spirit of the invention. For instance, the actions can be performed in a differing order or actions can be added, deleted or modified. Also, the term "coupled" and variations thereof describes having a communications path between two elements and does not imply a direct connection between the elements with no intervening elements/connections between them. All of these variations are considered a part of the specification.

In the accompanying figures and following detailed description of the disclosed embodiments, the various elements illustrated in the figures are provided with two or three digit reference numbers. With minor exceptions, the leftmost digit(s) of each reference number corresponds to the figure in which its element is first illustrated.

DETAILED DESCRIPTION

Various embodiments of the invention are described herein with reference to the related drawings. Alternative embodiments of the invention can be devised without departing from the scope of this invention. Various connections and positional relationships (e.g., over, below, adjacent, etc.) are set forth between elements in the following description and in the drawings. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. Moreover, the various tasks and process steps described herein can be incorporated into a more comprehensive procedure or process having additional steps or functionality not described in detail herein.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" may be understood to include any integer number greater than or equal to one, i.e. one, two, three, four, etc. The terms "a plurality" may be understood to include any integer number greater than or equal to two, i.e. two, three, four, five, etc. The term "connection" may include both an indirect "connection" and a direct "connection."

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

For the sake of brevity, conventional techniques related to making and using aspects of the invention may or may not be described in detail herein. In particular, various aspects of computing systems and specific computer programs to implement the various technical features described herein are well known. Accordingly, in the interest of brevity, many conventional implementation details are only mentioned briefly herein or are omitted entirely without providing the well-known system and/or process details.

As mentioned above, SMP computing systems can implement multiple SMP I/O cards, with each I/O card supporting multiple I/O ports. However, the I/O ports of each I/O card have to be of the same type, i.e., support the same functional firmware running for all Peripheral Component Interconnect (PCI) functions supported by the SMP computing system. When this requirement is not met (i.e., there is a firmware configuration mismatch), there is no detection of a configuration mismatch and no indication to the operator or system administrator of the configuration mismatch.

Turning now to an overview of the aspects of the invention, one or more embodiments of the invention address the above-described shortcomings of the prior art by detecting and alerting of firmware configuration mismatches associated with SMP I/O ports included in SMP computing systems. The detection of configuration errors can happen at various stages. At port initialization, for example, time to allow currently functioning ports to continue functioning while ensuring that configuration errors are detected for other ports message passing can be used. For example, when one port is configured and running to support firmware while the other one incorrectly configured to support the firmware, one or more embodiments described here can detect a port configuration mismatch at port initialization. In at least one non-limiting embodiment, the SMP computing system utilizes a memory unit that is shared between multiple I/O ports to report configuration data. An error detection unit analyzes the configuration data to detect a firmware configuration mismatch.

In one or more non-limiting embodiments, the shared memory facilitates communication of data between each of the I/O ports on a given SMP I/O card. For example, during PCI initialization of a vendor card, the shared memory is used to gain lock the PCI-mapped memory area. The term "gain lock" refers to a message passing technique with the "lock" being a type of message. In turn, each of the I/O ports can access the shared memory to obtain the recorded PCI read/write data. Accordingly, at least one embodiment described herein allows communication between multi-port cards where each port is independently controlled by vendor firmware. The messages passing operation between ports on the card, also referred to a "gain lock" operation can be facilitated using shared memory, interrupts, or other mechanisms.

In addition, I/O port-type data can be written into the shared memory. The I/O port-type data indicates the type of I/O port the functional firmware intends to operate. When another I/O port attempts card initialization, it can read the existing data in the shared memory and determine whether to proceed with its initialization when the previous port is of the same kind, or halt the initialization when the previous port is mismatched and output a control signal indicating the mismatch configuration error.

Figure 1:
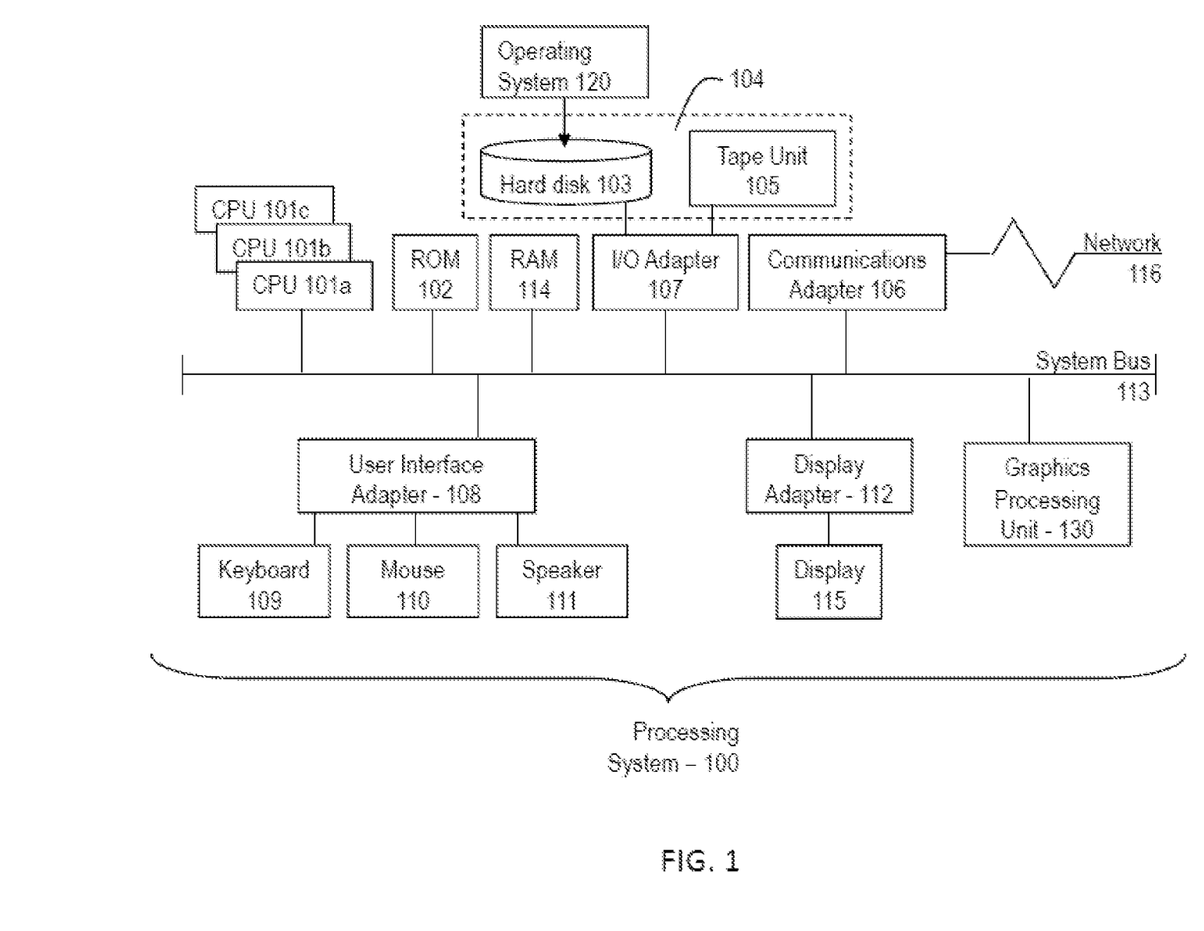
FIG. 1 depicts a block diagram illustrating an example of a computing system capable of performing the teachings described herein according to a non-limiting embodiment.

With reference now to FIG. 1, there is shown an embodiment of a processing system 100 for implementing the teachings herein. In this embodiment, the system 100 has one or more central processing units (processors) 101a, 101b, 101c, etc., which are collectively or generically referred to as processor(s) 101. In one embodiment, each processor 101 may include a reduced instruction set computer (RISC) microprocessor. Processors 101 are coupled to system memory 114 and various other components via a system bus 113. Read only memory (ROM) 102 is coupled to the system bus 113 and may include a basic input/output system (BIOS), which controls certain basic functions of system 100.

FIG. 1 further depicts an input/output (I/O) adapter 107 and a network adapter 106 coupled to the system bus 113. I/O adapter 107 may be a small computer system interface (SCSI) adapter that communicates with a hard disk 103 and/or tape storage drive 105 or any other similar component. I/O adapter 107, hard disk 103, and tape storage device 105 are collectively referred to herein as mass storage 104. Operating system 120 for execution on the processing system 100 may be stored in mass storage 104. A network adapter 106 interconnects bus 113 with an outside network 116 enabling data processing system 100 to communicate with other such systems. A screen (e.g., a display monitor) 115 is connected to system bus 113 by display adaptor 112, which may include a graphics adapter to improve the performance of graphics intensive applications and a video controller. In one embodiment, adapters 107, 106, and 112 may be connected to one or more I/O busses that are connected to system bus 113 via an intermediate bus bridge (not shown). Suitable I/O buses for connecting peripheral devices such as hard disk controllers, network adapters, and graphics adapters typically include common protocols, such as the Peripheral Component Interconnect (PCI). Additional input/output devices are shown as connected to system bus 113 via user interface adapter 108 and display adapter 112. A keyboard 109, mouse 110, and speaker 111 all interconnected to bus 113 via user interface adapter 108, which may include, for example, a Super I/O chip integrating multiple device adapters into a single integrated circuit.

In exemplary embodiments, the processing system 100 includes a graphics processing unit 130. Graphics processing unit 130 is a specialized electronic circuit designed to manipulate and alter memory to accelerate the creation of images in a frame buffer intended for output to a display. In general, graphics processing unit 130 is very efficient at manipulating computer graphics and image processing and has a highly parallel structure that makes it more effective than general-purpose CPUs for algorithms where processing of large blocks of data is done in parallel.

Thus, as configured in FIG. 1, the system 100 includes processing capability in the form of processors 101, storage capability including system memory 114 and mass storage 104, input means such as keyboard 109 and mouse 110, and output capability including speaker 111 and display 115. In one embodiment, a portion of system memory 114 and mass storage 104 collectively store an operating system to coordinate the functions of the various components shown in FIG. 1.

One or more embodiments improve over the prior art by no longer having to rely on information provided in a packet received from an I/O device for ordering a data stream into memory. The bandwidth is further increased because the ordering of payload data can be relaxed, where the indication of the payload and/or non-payload data is determined by the program running on the processor which has knowledge of the memory location of the data. The program can instruct the hardware how to manage data received in a data stream.

In one or more embodiments, the processing efficiency of the CPU is increased due to the relaxed ordering of the data stream. In addition, the CPU is not being held up as data is being transferred into the memory subsystem from the I/O subsystem. The reliability is increased due to the internal classification of packets that are associated with signaling and payload data.

Figure 2:
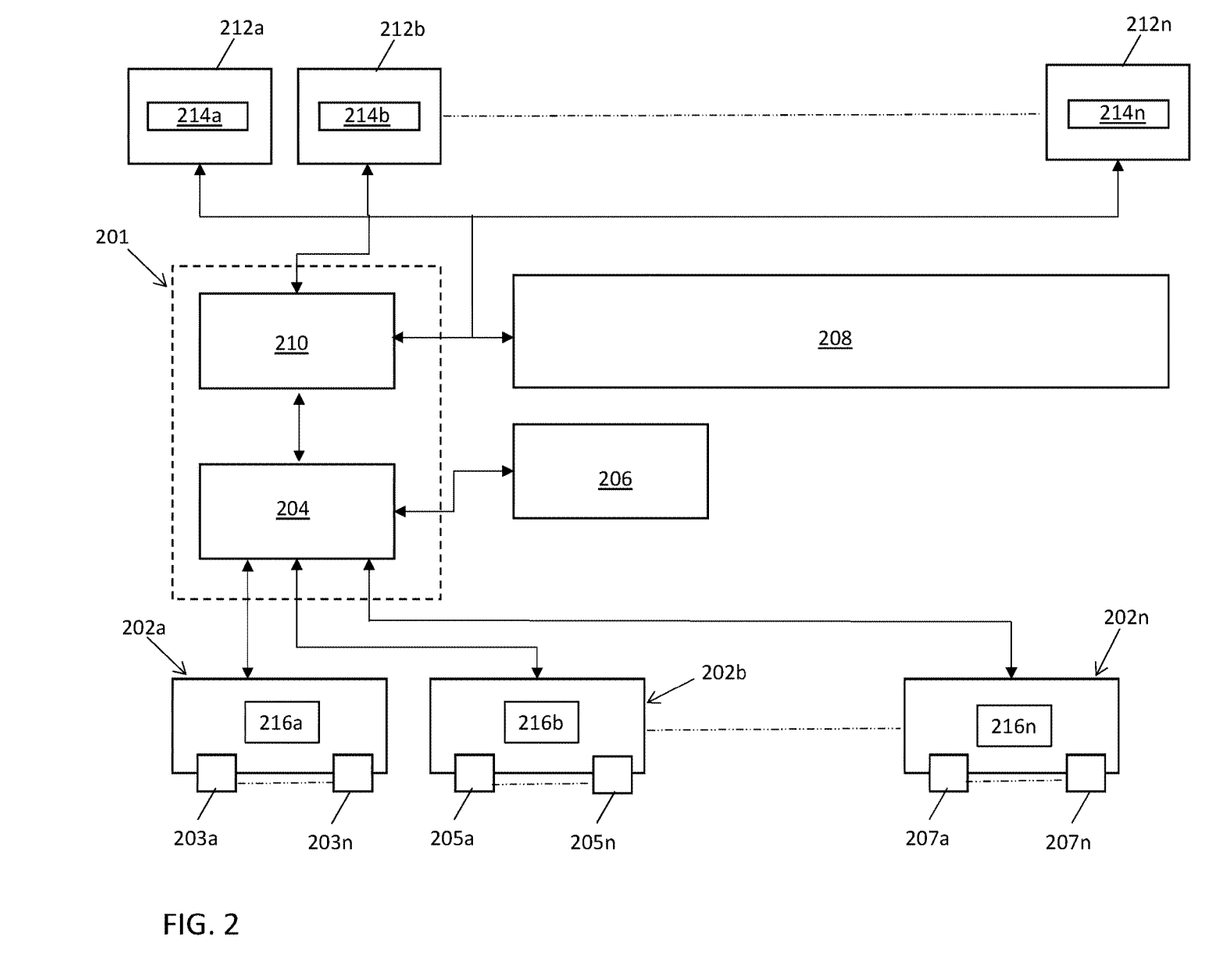
FIG. 2 depicts a block diagram of a simultaneous multi-processing system capable of detecting configuration errors of multiport I/O cards according to a non-limiting embodiment.

Referring now to FIG. 2, a simultaneous multi-processing (SMP) system capable of detecting configuration errors of multiport I/O cards is illustrated according to a non-limiting embodiment. The SMP system 200 includes a plurality of input/output (I/O) devices 202a, 202b, 202n configured to transfer data either directly or over a network. In one or more embodiments, the I/O devices 202a, 202b, 202n can be peripheral component interconnect PCI-Express connected I/O devices. For example, the I/O devices 202a, 202b, 202n can include, for example, a host bus adapter (HBA) configured to support individual I/O cards 202a, 202b, 202n. Each I/O card 202a, 202b, 202n can support a plurality of I/O ports 203a-203n, 205a-205n and 207a-207n, respectively. In at least one embodiment, each I/O card 202a, 202b, 202n is installed with port-specific firmware 216a, 216b, 216n. Accordingly, each port 203a-203n, 205a-205n, and 207a-207n supported by a given I/O card 202a, 202b, 202n is configured to be of the same type i.e. operates according to the same functional firmware 216a, 216b, 216n of a given I/O card 202a, 202b, 202n.

The SMP system further includes an I/O controller 201 that employs a bridge unit 204 and a bridge controller 210. The bridge unit 204 is coupled to the I/O cards 202a, 202b, 202n that transfer data, along with a plurality of processors 212a, 212b, 212n. The bridge unit 204 is configured to send commands to the bridge controller 210, which operates to manage data transfers. In at least one embodiment, the bridge unit 204 can be a PCI-Express bridge unit (PBU) 204. The bridge unit 204 is in signal communication with an I/O address table 206 (sometimes referred to I/O address translation logic) and is configured to perform address translation for received data of a data stream having address information. The address translation can be used to convert an external address to an address associated with a location in a memory subsystem 208. Although the I/O address table 206 is illustrated as being external to the bridge unit 204, it should be appreciated that systems exist where I/O address table 2006 is located in the bridge unit 204, where the I/O address table 206 includes logic that serves to translate virtual I/O addresses received over the I/O bus into physical addresses in the memory subsystem. In another embodiment, the bridge unit 204 can be a host bridge (ETU) that performs the address translation for the PCI-Express address. The ETU searches the memory and determines the target page associated with the PCI-Express address of the data packet. In one or more embodiments, the target page can either be associated with a signaling page or a payload page. The ETU uses this information and passes this information to the PCI-Express bridge controller which includes an ordering controller which controls the ordering of the packets prior to transferring the packets to memory based on the information from the ETU.

In an embodiment, the bridge controller 210 is a PCI-Express bridge controller (PBC). The bridge controller 210 can include an ordering controller (not shown) that is configured to communicate with the bridge unit 204, the processors 212a, 212b, 212n, and the memory subsystem 208. In one or more embodiments, the processors 212a, 212b, 212n execute instructions provided by a program 214a, 214b, 214n, sometimes referred to as applications 214a, 214b, 214n, or software. The bridge controller 210 uses the information in the command to control the ordering of the packets to be transferred to the memory 208. However, when a packet that is associated with signaling information is processed, the preceding packets will be pushed out regardless of having a flag set indicating the ordering hint bit or not.

In one or more embodiments, the bridge controller 210 can manage the received data that is to be transferred to memory 208. In an embodiment, a bridge unit 204 is configured to transmit data from the I/O cards 202a, 202b, 202n to the bridge controller 210, and in turn the bridge controller 210 processes the data based on commands received from the bridge unit 204. In one or more embodiments, the bridge unit 204 is configured to modify the command message transmitted to the bridge controller 210 by appending a flag indicating whether a received packet is associated with signaling or payload data. In response to receiving the command, the bridge controller 210 can control the transfer of data based at least in part on the received command.

Figure 3:
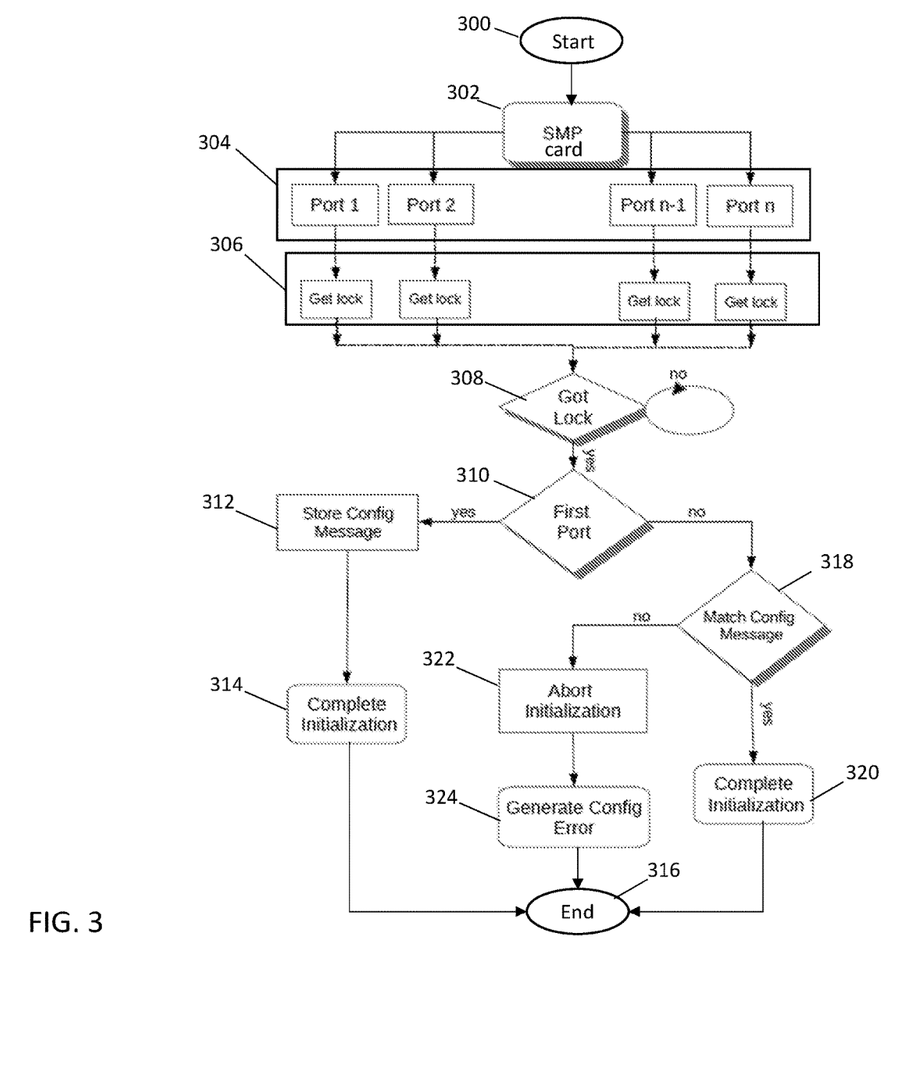
FIG. 3 is a flowchart illustrating a method for detecting configuration errors of multiport I/O cards implemented in a simultaneous multi-processing system according to a non-limiting embodiment.

Turning to FIG. 3, a method for detecting configuration errors of multiport I/O cards implemented in a simultaneous multi-processing system is illustrated according to a non-limiting embodiment. The method begins at operation 300, and at operation 302 an SMP I/O card establishes communication with multiple I/O ports installed thereon. At operation 304, the SMP I/O card identifies each I/O port among the multiple I/O ports. At operation 306, the SMP I/O card attempts to achieve a gain lock on each installed port. At operation 308, a determination is made as to whether the SMP I/O card has gained lock on the installed ports. When a lock has not been gained, the method returns to operation 308 and continues attempting to gain lock. When, however, a gain lock has been achieved, the method proceeds operation 310 to determine whether a given port is attempting initialization.

When the attempted initialization is the first attempt of any port installed on the SMP I/O card at an initialization, the method proceeds to operation 312 and stores the port's configuration message in memory. The configuration message includes configuration details about the port such as, for example, the type of I/O function the port intends to run. In at least one embodiment, the system can operate so that in case the first initialization fails the configuration message will not be stored. However, upon a successful initialization, the configuration message will be stored. Accordingly, even if the first initialization attempt fails, there will not be any issues (i.e., no configuration failures or configuration mismatches) that will be caused as there will be no configuration message and the subsequent initializations start off as if they are the first port to be initialized. At operation 314, the initialization of the port is completed and the method ends at operation 316.

When, however, the attempted initialization at operation 310 is not the first attempt of any port installed on the SMP I/O card at an initialization, the method proceeds to operation 318. In other words, when a port installed on the SMP I/O card has already completed a previous initialization, the method proceeds to operation 318 and compares the configuration details of the current initializing port with the previously generated configuration details stored in the memory. When the current configuration details match the previously generated configuration details, the current initialization of the port is completed at operation 320, and the method ends at operation 314.

When, however, the current configuration details do not match the previously generated configuration details at operation 318, the current initialization of the port is aborted at operation 322. At operation 324, an error message indicating the I/O port configuration mismatch is output by the SMP I/O card, and the message ends at operation 314.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instruction by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

What is claimed is:

1. A computer-implemented method for detecting an input/output (I/O) device configuration error, the method comprising:
   sharing a memory unit among a plurality of I/O ports included with an I/O device installed with firmware;
   storing previously generated I/O configuration data in the memory unit prior to an I/O configuration initialization, the previously generated I/O configuration data including first port-type data generated by a configured I/O port among the plurality of I/O ports indicating a type of I/O port configured to operate according to the firmware;
   detecting, via the I/O device, an attempt by a given I/O port among the plurality of I/O ports to perform a current I/O configuration initialization;
   generating, via the given I/O port, current I/O configuration data corresponding to the current I/O configuration initialization, the current I/O configuration data generated after the previously generated I/O configuration data and including second port-type data indicating a type of I/O port configured to operate according to an intended firmware;
   storing the current I/O configuration data in the memory unit;
   comparing, via the I/O device, the current I/O configuration data to the previously generated I/O configuration data; and
   detecting, via the I/O device, the I/O device configuration error in response to determining a mismatch between the current I/O configuration data and the previously generated I/O configuration data, the I/O device configuration error including a firmware configuration mismatch indicating that the intended firmware indicated by the given I/O port does not match the firmware indicated by the configured I/O port.

2. The method of claim 1, wherein the I/O device is installed on a simultaneous multi-processing (SMP) computing system that implements multiple central processing units (CPUs).

3. The method of claim 2, wherein the I/O device configuration error includes a mismatch between an intended I/O function indicated by the given I/O port and a previously indicated I/O function.

4. The method of claim 3, further comprising outputting, via the I/O device, an error message indicating the mismatch between the intended I/O function and the previously indicated I/O function.

5. The method of claim 4, wherein the previously indicated I/O function is generated by a different I/O port among the plurality of I/O ports.

6. The method of claim 5, further comprising obtaining, via the I/O device, the previously generated I/O configuration data and the current I/O configuration data from the memory unit to perform the comparison between one another.

7. The method of claim 6, wherein the current I/O configuration initialization is aborted in response to determining the mismatch between the current I/O configuration data and the previously generated I/O configuration data.

8. A computing system configured to detect an input/output (I/O) device configuration error, the computing system comprising:
   an I/O device installed with firmware configured to control an I/O function of the I/O device;
   a plurality of I/O ports installed on the I/O device, at least one I/O port among the plurality of I/O ports configured to output a request to perform a current I/O configuration initialization, and to generate current I/O configuration data corresponding to the current I/O configuration initialization, the current I/O configuration data including second port-type data indicating a type of I/O port configured to operate according to an intended firmware; and
   a memory unit in signal communication with the each of the I/O ports included with the I/O device, the memory unit configured to store the current I/O configuration data and previously generated I/O configuration data, the previously generated I/O configuration data including first port-type data generated by a configured I/O port among the plurality of I/O ports indicating a type of I/O port configured to operate according to the firmware,
   wherein the I/O device compares the current I/O configuration data to the previously generated I/O configuration data, and detects the I/O device configuration error in response to determining a mismatch between the current I/O configuration data and the previously generated I/O configuration data, and
   wherein the I/O device configuration error includes a firmware configuration mismatch indicating that the intended firmware indicated by the given I/O port does not match the firmware indicated by the configured I/O port.

9. The computing system of claim 8, wherein the I/O device is installed on a simultaneous multi-processing (SMP) computing system that implements multiple central processing units (CPUs).

10. The computing system of claim 9, wherein the I/O device configuration error includes a mismatch between an intended I/O function indicated by the at least one I/O port and a previously indicated I/O function.

11. The computing system of claim 10, wherein the I/O device outputs an error message indicating the mismatch between the intended I/O function and the previously indicated I/O function.

12. The computing system of claim 11, wherein the previously indicated I/O function is generated by a different I/O port among the plurality of I/O ports.

13. The computing system of claim 12, wherein the different I/O port stores the previously generated I/O configuration data in the memory unit prior to the current I/O configuration initialization.

14. The computing system of claim 13, wherein the I/O device aborts the current I/O configuration initialization in response to determining the mismatch between the current I/O configuration data and the previously generated I/O configuration data.

15. A computer program product for detecting an input/output (I/O) device configuration error, the computer program product comprising:
a computer readable storage medium having stored thereon first program instructions executable by a processor to cause the processor to:
store previously generated I/O configuration data in a memory unit prior to an I/O configuration initialization, the memory unit shared among a plurality of I/O ports included with an of I/O device installed with firmware, the previously generated I/O configuration data including first port-type data generated by a configured I/O port among the plurality of I/O ports indicating a type of I/O port configured to operate according to the firmware;
detect, via the I/O device, an attempt by a given I/O port among the plurality of I/O ports to perform a current configuration I/O initialization;
generate, via the given I/O port, current I/O configuration data corresponding to the current I/O configuration initialization, the current I/O configuration data generated after the previously generated I/O configuration data and including second port-type data indicating a type of I/O port configured to operate according to an intended firmware;
store the current I/O configuration data in the memory unit;
compare, via the I/O device, the current I/O configuration data to the previously generated I/O configuration data; and
detect, via the I/O device, the I/O device configuration error in response to determining a mismatch between the current I/O configuration data and the previously generated I/O configuration data, the I/O device configuration error including a firmware configuration mismatch indicating that the intended firmware indicated by the given I/O port does not match the firmware indicated by the configured I/O port.

16. The computer program product of claim 15, wherein the I/O device is installed on a simultaneous multi-processing (SMP) computing system that implements multiple central processing units (CPUs).

17. The computer program product of claim 16, wherein the I/O device configuration error includes a mismatch between an intended I/O function indicated by the given I/O port and a previously indicated I/O function.

18. The computer program product of claim 17, where the processor further causes the I/O device to output an error message indicating the mismatch between the intended I/O function and the previously indicated I/O function.

19. The computer program product of claim 18, wherein the previously indicated I/O function is generated by a different I/O port among the plurality of I/O ports.

20. The computing system of claim 8, wherein the I/O device is a simultaneous multi-processing (SMP) I/O card.

* * * * *